(12) United States Patent
Araujo Da Silva et al.

(10) Patent No.: US 11,305,582 B2
(45) Date of Patent: Apr. 19, 2022

(54) PNEUMATIC TIRE COMPRISING A TREAD COMPRISING A THERMOPLASTIC ELASTOMER AND A CROSS-LINKING SYSTEM BASED ON AT LEAST ONE PEROXIDE

(71) Applicant: COMPAGNIE GENERALE DES ETABLISSEMENTS MICHELIN, Clermont-Ferrand (FR)

(72) Inventors: José-Carlos Araujo Da Silva, Clermont-Ferrand (FR); Benjamin Gornard, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 413 days.

(21) Appl. No.: 16/462,005

(22) PCT Filed: Nov. 15, 2017

(86) PCT No.: PCT/EP2017/079287
§ 371 (c)(1),
(2) Date: May 17, 2019

(87) PCT Pub. No.: WO2018/091510
PCT Pub. Date: May 24, 2018

(65) Prior Publication Data
US 2019/0329590 A1    Oct. 31, 2019

(30) Foreign Application Priority Data
Nov. 17, 2016  (FR) ...................................... 1661141

(51) Int. Cl.
*B60C 1/00*  (2006.01)
*B60C 11/00*  (2006.01)
(Continued)

(52) U.S. Cl.
CPC ........ *B60C 1/0016* (2013.01); *B60C 11/0008* (2013.01); *C08F 297/04* (2013.01);
(Continued)

(58) Field of Classification Search
CPC ................ C08F 2810/20; C08F 297/04; C08F 297/046; B60C 11/0008; B60C 1/0016; B60C 2011/0016
See application file for complete search history.

(56) References Cited

U.S. PATENT DOCUMENTS 3,814,160 A * 6/1974 Creasey ................ B60C 11/005
152/154.2
4,946,899 A    8/1990 Kennedy et al.
(Continued)

FOREIGN PATENT DOCUMENTS

CN    103857736 A    6/2014
CN    103998221 A    8/2014
(Continued)

OTHER PUBLICATIONS

Z. Fodor & J.P. Kennedy, "Polyisobutylene-containing block polymers by sequential monomer addition", Polymer Bulletin, 29, pp. 697-704 (1992).
(Continued)

*Primary Examiner* — Mark S Kaucher
(74) *Attorney, Agent, or Firm* — Venable LLP

(57) ABSTRACT

A tire (1) comprises a tread (3), a crown with a crown reinforcement (2), two sidewalls (5), two beads (4), a carcass reinforcement (6) anchored to the two beads (4) and extending from one sidewall (5) to the other, the tread comprising (a) an elastomeric matrix which comprises predominantly one or more thermoplastic elastomers comprising at least one elastomer block and at least one thermoplastic block, and (b) a crosslinking system based on one or more perox-
(Continued)

ides. The invention also relates to a process for preparing the tire.

30 Claims, 1 Drawing Sheet

(51) Int. Cl.
  *C08F 297/04* (2006.01)
  *C08F 297/08* (2006.01)
(52) U.S. Cl.
  CPC ...... *C08F 297/046* (2013.01); *C08F 297/086* (2013.01); *B60C 2011/0016* (2013.01); *C08F 2810/20* (2013.01)

(56) References Cited

U.S. PATENT DOCUMENTS

| | | | |
|---|---|---|---|
| 5,977,238 | A | 11/1999 | Labauze |
| 6,013,718 | A | 1/2000 | Cabioch et al. |
| 6,503,973 | B2 | 1/2003 | Robert et al. |
| 6,815,473 | B2 | 11/2004 | Robert et al. |
| 7,250,463 | B2 | 7/2007 | Durel et al. |
| 7,312,264 | B2 | 12/2007 | Gandon-Pain |
| 9,403,406 | B2 | 8/2016 | Custodero et al. |
| 9,849,727 | B2 | 12/2017 | Abad et al. |
| 10,081,723 | B2 | 9/2018 | Chouvel et al. |
| 2001/0036991 | A1 | 11/2001 | Robert et al. |
| 2005/0004297 | A1 | 1/2005 | Durel et al. |
| 2006/0089445 | A1 | 4/2006 | Gandon-Pain |
| 2014/0076473 | A1 | 3/2014 | Abad et al. |
| 2014/0305558 | A1 | 10/2014 | Abad et al. |
| 2014/0343190 | A1 | 11/2014 | Custodero et al. |
| 2015/0231925 | A1 | 8/2015 | Custodero et al. |
| 2016/0312014 | A1 | 10/2016 | Lemerle et al. |
| 2019/0322136 | A1 | 10/2019 | Araujo da Silva et al. |

FOREIGN PATENT DOCUMENTS

| | | |
|---|---|---|
| EP | 1127909 A1 | 8/2001 |
| FR | 2740778 A1 | 5/1997 |
| FR | 2765882 A1 | 1/1999 |
| WO | 01/92402 A1 | 12/2001 |
| WO | 03/016387 A1 | 2/2003 |
| WO | 2004/096865 A2 | 11/2004 |
| WO | 2012/152686 A1 | 11/2012 |
| WO | 2013/087484 A1 | 6/2013 |
| WO | 2013/087879 A1 | 6/2013 |
| WO | 2014/041167 A1 | 3/2014 |

OTHER PUBLICATIONS

J.E. Puskas, et al., "Polyisobutylene-Containing Block Polymers by Sequential Monomer Addition. IV. New Triblock Thermoplastic Elastomers Comprising High Tg Styrenic Glassy Segments: Synthesis, Characterization and Physical Properties", Journal of Polymer Science: Part A: Polymer Chemistry, 30, pp. 41-48 (1992).

J.P. Kennedy, et al., "Polyisobutylene-Containing Block Copolymers by Sequential Monomer Addition. 5. Synthesis, Characterization, and Select Properties of Poly(p-tert-butylstyrene-b-isobutylene-b-p-tert-butylstyrene", Macromolecules, 24, pp. 6572-6577 (1991).

G. Kaszas, et al., "New Thermoplastic Elastomers of Rubbery Polyisobutylene and Glassy Cyclopolyisoprene Segments", Journal of Applied Polymer Science, 39, pp. 119-144 (1990).

J.E. Puskas, et al., "New Transparent Flexible UV-Cured Films From Polyisobutylene-Polyisoprene Block Polymers", J. Macromol. Sci.—Chem., A28(1), pp. 65-80 (1991).

P.S. Tucker et al., "Thermal, Mechanical, and Morphological Analyses of Poly(2,6-dimethyl-1,4-phenylene oxide) / Styrene-Butadiene-Styrene Blends", Macromolecules, 21, pp. 1678-1685 (1988).

U.S. Appl. No. 16/065,287, filed Dec. 15, 2016, available at USPTO System.

International Search Report dated Jan. 30, 2018, in corresponding PCT/EP2017/079287 (4 pages).

\* cited by examiner

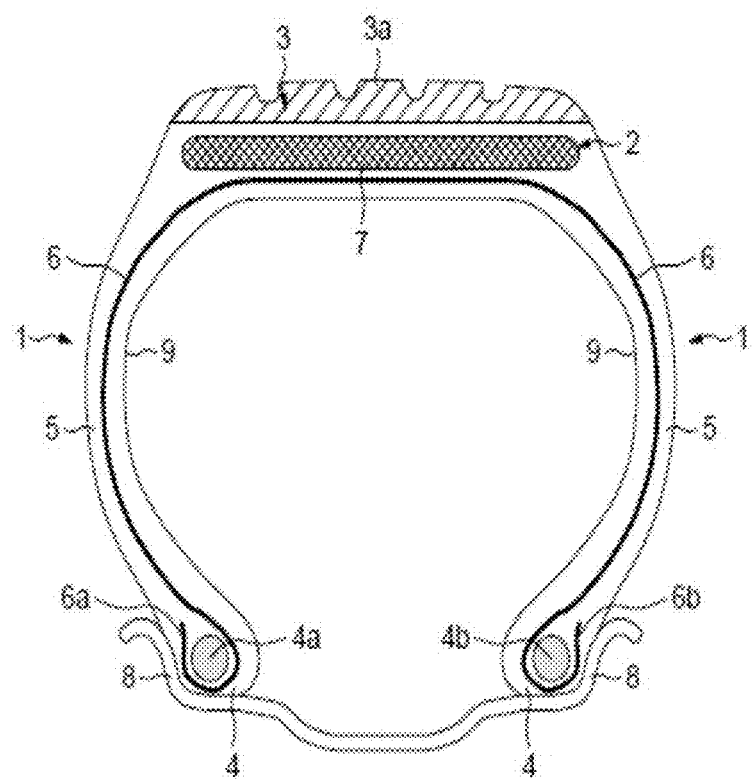

PNEUMATIC TIRE COMPRISING A TREAD COMPRISING A THERMOPLASTIC ELASTOMER AND A CROSS-LINKING SYSTEM BASED ON AT LEAST ONE PEROXIDE

BACKGROUND

The present invention relates to "inflatable" articles, that is to say, by definition, to articles which assume their usable form when they are inflated with air or with an equivalent inflation gas.

More particularly, the present invention relates to a tyre comprising a tread comprising a) an elastomeric matrix which comprises predominantly by weight one or more thermoplastic elastomers, and b) a crosslinking system based on one or more peroxides.

The invention also relates to a process for preparing the tyre according to the invention.

In a conventional tyre, the tread generally comprises predominantly by weight one or more diene elastomers.

A constant aim of tyre manufacturers is to improve the wet grip of tyres. At the same time, another aim is to reduce the rolling resistance of tyres. However, these two aims are difficult to reconcile in that the improvement in grip implies increasing the hysteresis losses whereas the improvement in the rolling resistance implies lowering the hysteresis losses. There is therefore a compromise in performance to be optimized.

Consequently, the applicant companies previously developed (WO 2012/152686) tyres equipped with a tread comprising a thermoplastic elastomer. These tyres have a very good compromise in grip and rolling resistance performance.

Furthermore, the treads made of thermoplastic elastomers have an easier processing due to a low viscosity at temperature.

However, on the finished tyre, it may be that the low stiffness at high temperature that is desired for the processing is then a problem for the performance of the tyre, in particular during use at high temperature. Specifically, during tyre use cycles such as braking cycles, this may result, in extreme cases, in a softening of the tread which would have the consequence of reducing the endurance of the tread.

Generally, the temperature resistance performances of treads can still be improved.

Consequently, there is a need to improve the temperature resistance of thermoplastic elastomer treads without degrading the processing possibilities of these treads.

A person skilled in the art knows that thermoplastic elastomers are generally not chemically crosslinked. The thermoplastic blocks ("hard" blocks) of thermoplastic elastomers usually act as a physical "crosslinker". They provide sufficient cohesion to the tread.

In particular, in application WO 2014/041167 which discloses a tyre comprising a tread comprising predominantly by weight a thermoplastic elastomer and carbon black, there is nothing to encourage a person skilled in the art to use a crosslinking system in the tread compositions, in particular in view of the comment in paragraph [0088] of said document.

However, the applicant has now surprisingly discovered that a crosslinking of the tread by means of a crosslinking system based on one or more peroxides made it possible to respond to the constraints formulated above, in particular to improve the temperature resistance of thermoplastic elastomer treads while retaining the processing possibilities associated with these treads.

SUMMARY

Thus, one subject of the invention is a tyre comprising a tread, a crown with a crown reinforcement, two sidewalls, two beads, a carcass reinforcement anchored to the two beads and extending from one sidewall to the other, the tread comprising a) an elastomeric matrix which comprises predominantly one or more thermoplastic elastomers comprising at least one elastomer block and at least one thermoplastic block, and b) a crosslinking system based on one or more peroxides.

The tyre according to the invention has a good compromise in properties, in particular between, on the one hand, an easier processing during its preparation and, on the other hand, an improved stiffness at high temperature.

Another Subject of the Invention is a Process for Preparing a Tyre Comprising a Tread as Defined Above, Comprising the Following Steps:

extruding the tread or blending in an internal or external mixer of the tread with or without the crosslinking system, it being understood that when the blending of the tread is performed without the crosslinking system, the crosslinking system is introduced subsequently into the internal or external mixer, then placing the extruded or calendered tread on the tyre, then curing the tyre.

BRIEF DESCRIPTION OF THE FIGURES

The invention and its advantages will be easily understood from reading the description and exemplary embodiments which follow and from studying the single FIGURE which represents a tyre according to the invention in radial cross section.

DETAILED DESCRIPTION

In the present invention, unless expressly indicated otherwise, all the percentages (%) given are % by weight.

Furthermore, any range of values denoted by the expression "between a and b" represents the range of values extending from more than a to less than b (that is to say, limits a and b excluded), while any range of values denoted by the expression "from a to b" means the range of values extending from a up to b (that is to say, including the strict limits a and b).

In the present application, the term "parts per hundred parts of elastomer" or "phr" means the part by weight of a constituent per 100 parts by weight of the elastomer(s) of the elastomeric matrix, i.e. of the total weight of the elastomer(s), whether they are thermoplastic or non-thermoplastic, present in the elastomeric matrix. Thus, a constituent at 60 phr will mean, for example, 60 g of this constituent per 100 g of elastomer of the elastomeric matrix.

As described above, the tyre according to the invention comprises in particular a tread which comprises an elastomeric matrix comprising predominantly by weight one or more thermoplastic elastomers.

The term "predominantly by weight one or more thermoplastic elastomers" means that the elastomeric matrix comprises at least 50% by weight, preferably at least 65% by weight, more preferentially at least 70% by weight, and in particular at least 75% by weight of thermoplastic elastomers relative to all of the elastomers present in the elastomeric matrix of the tread.

A thermoplastic elastomer (TPE) is understood, in a known manner, to mean a polymer having a structure intermediate between a thermoplastic polymer and an elastomer.

A thermoplastic elastomer consists of one or more rigid "thermoplastic" segments connected to one or more flexible "elastomer" segments.

Thus, the thermoplastic elastomer or elastomers of the tread that can be used according to the invention comprise at least one elastomer block and at least one thermoplastic block.

Typically, each of these segments or blocks contains at least more than 5, generally more than 10 base units.

In the present application, when reference is made to the glass transition temperature of a thermoplastic elastomer, it is the glass transition temperature relating to the elastomer block (unless otherwise indicated). Indeed, in a known manner, thermoplastic elastomers have two glass transition temperature peaks (Tg, measured according to ASTM D3418), the lowest temperature being related to the elastomer part of the thermoplastic elastomer and the highest temperature being related to the thermoplastic part of the thermoplastic elastomer. Thus, the flexible blocks of the thermoplastic elastomers are generally defined by a Tg below or equal to ambient temperature (25° C.), whilst the rigid blocks have a Tg above or equal to 80° C. In order to be of both elastomeric and thermoplastic nature, the thermoplastic elastomer must be provided with blocks that are sufficiently incompatible (that is to say different due to their respective weight, their respective polarity or their respective Tg) in order to retain their characteristic elastomer block or thermoplastic block properties.

Thus, the thermoplastic elastomer or elastomers that can be used according to the invention (therefore the elastomer block(s) of the thermoplastic elastomers) preferentially have a glass transition temperature which is below or equal to 25° C., more preferentially below or equal to 10° C. A Tg value above these minima may reduce the performances of the tread during use at very low temperature; for such a use, the glass transition temperature of the thermoplastic elastomers is more preferentially still less than or equal to −10° C.

Also preferentially, the glass transition temperature of the thermoplastic elastomers that can be used according to the invention is greater than −100° C.

The number-average molecular weight (denoted by Mn) of the thermoplastic elastomers is preferentially between 30 000 and 500 000 g/mol, more preferentially between 40 000 and 450 000 g/mol. Below the minima indicated, there is a risk of the cohesion between the elastomer chains of the thermoplastic elastomers being affected, in particular due to their possible dilution (in the presence of an extender oil); furthermore, there is a risk of an increase in the working temperature affecting the mechanical properties, in particular the properties at break, with the consequence of a reduced "hot" performance. Furthermore, an excessively high Mn weight can be detrimental to the implementation. Thus, it has been found that a value between 50 000 and 300 000 g/mol was particularly well suited to use of the thermoplastic elastomers in a tyre tread.

The number-average molecular weight (Mn) of the thermoplastic elastomers is determined in a known manner, by size exclusion chromatography (SEC). The sample is first dissolved in a suitable solvent at a concentration of about 2 g/l and then the solution is filtered on a filter with a porosity of 0.45 μm before injection. The apparatus used is a Waters Alliance chromatographic line. The injected volume of the solution of the polymer sample is 100 μl. The detector is a Waters 2410 differential refractometer and its associated software, for making use of the chromatographic data, is the Empower system. The conditions can be adjusted by those skilled in the art. For example, in the case of TPEs of COPE type, the elution solvent is hexafluoroisopropanol with sodium trifluoroactetate salt at a concentration of 0.02M, the flow rate is 0.5 ml/min, the temperature of the system is 35° C. and the analysis time is 90 min. Use is made of a set of three PHENOMENEX columns in series, with "PHENOGEL" trade names (pore size: $10^5$, $10^4$, $10^3$ A). For example, in the case of styrene thermoplastic elastomers, the sample is first dissolved in tetrahydrofuran at a concentration of approximately 1 g/l and then the solution is filtered on a filter with a porosity of 0.45 μm before injection. The apparatus used is a Waters Alliance chromatographic line. The elution solvent is tetrahydrofuran, the flow rate is 0.7 ml/min, the temperature of the system is 35° C. and the analysis time is 90 min. A set of four WATERS "STYRAGEL" columns (an HMW7 column, an HMW6E column and two HT6E columns) are used in series. The injected volume of the solution of the polymer sample is 100 μL. The detector is a Waters 2410 differential refractometer and its associated software, for making use of the chromatographic data, is the Waters Millennium system. The calculated average molar weights are relative to a calibration curve produced with polystyrene standards.

The polydispersity index (PI=Mw/Mn, with Mw the weight-average molecular weight) of the thermoplastic elastomer or elastomers is preferably less than 3; more preferentially less than 2 and more preferentially still less than 1.5.

The thermoplastic elastomers that can be used according to the invention may be copolymers with a small number of blocks (less than 5, typically 2 or 3), in which case these blocks preferably have high weights of greater than 15 000 g/mol.

The thermoplastic elastomers may also be copolymers with a large number of smaller blocks (more than 30, typically from 50 to 500), in which case these blocks preferably have relatively low weights, for example from 500 to 5000 g/mol; these thermoplastic elastomers will subsequently be referred to as multiblock thermoplastic elastomers.

According to a first variant, the thermoplastic elastomers that can be used according to the invention are in a linear form.

In a first particular embodiment of this first variant, the thermoplastic elastomers are diblock copolymers: thermoplastic block/elastomer block.

In a second particular embodiment of this first variant, the thermoplastic elastomers are triblock copolymers: thermoplastic block/elastomer block/thermoplastic block, that is to say a central elastomer block and a terminal thermoplastic block at each of the two ends of the elastomer block.

In a third particular embodiment of this first variant, the thermoplastic elastomers are formed of a linear series of elastomer blocks and thermoplastic blocks (multiblock thermoplastic elastomers).

According to a second variant, the thermoplastic elastomers that can be used according to the invention are in a star-branched form comprising at least three branches.

For example, the thermoplastic elastomers can then be composed of a star-branched elastomer block comprising at least three branches and of a thermoplastic block located at the end of each of the branches of the elastomer block. The number of branches of the central elastomer can vary, for example, from 3 to 12 and preferably from 3 to 6.

According to a third variant, the thermoplastic elastomers that can be used according to the invention are in a branched or dendrimer form. The thermoplastic elastomers can then be composed of a branched or dendrimer elastomer block and of a thermoplastic block located at the end of the branches of the dendrimer elastomer block.

As explained above, the thermoplastic elastomer or elastomers that can be used according to the invention comprise at least one elastomer block and at least one thermoplastic block.

The elastomer blocks of the thermoplastic elastomers that can be used according to the invention can be any elastomer known to a person skilled in the art.

A distinction is generally made between saturated elastomer blocks and unsaturated elastomer blocks.

A saturated elastomer block is understood to mean that this block comprises essentially units comprising no ethylenic unsaturations (that is to say, carbon-carbon double bonds), that is to say that the units comprising ethylenic unsaturations represent less than 15 mol % relative to all of the units of the block considered.

An unsaturated elastomer block is understood to mean that this block comprises more than 15 mol % of units comprising ethylenic unsaturations relative to all of the units of the block considered.

The saturated elastomer blocks are generally formed by the polymerization of ethylenic monomers. Mention may in particular be made of polyalkylene blocks such as random ethylene-propylene or ethylene-butylene copolymers. These saturated elastomer blocks can also be obtained by hydrogenation of unsaturated elastomer blocks.

They can also be aliphatic blocks resulting from the family of the polyethers, polyesters or polycarbonates. In particular, the saturated elastomer blocks may especially be formed by polyethers, especially polytetramethylene glycol (PTMG), polyethylene glycols (PEGs).

According to one variant, the monomers polymerized in order to form a saturated elastomer block may be copolymerized, randomly, with at least one other monomer so as to form a saturated elastomer block. According to this variant, the molar fraction of polymerized monomer, other than an ethylenic monomer, relative to the total number of units of the saturated elastomer block, has to be such that this block retains its saturated elastomer properties. Advantageously, the molar fraction of this other comonomer can range from 0 to 50%, more preferentially from 0 to 45% and more preferentially still from 0 to 40%.

For example, conjugated $C_4$-$C_{14}$ dienes may be copolymerized with the ethylenic monomers, the ethylenic units remaining predominant as seen above.

Preferably, these conjugated dienes are selected from isoprene, butadiene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 1,3-hexadiene, 2-methyl-1,3-hexadiene, 3-methyl-1,3-hexadiene, 4-methyl-1,3-hexadiene, 5-methyl-1,3-hexadiene, 2,3-dimethyl-1,3-hexadiene, 2,4-dimethyl-1,3-hexadiene, 2,5-dimethyl-1,3-hexadiene, 2-neopentylbutadiene, 1,3-cyclopentadiene, 1,3-cyclohexadiene, 1-vinyl-1,3-cyclohexadiene and a mixture of these conjugated dienes, and preferably these conjugated dienes are selected from isoprene and a mixture of conjugated dienes containing isoprene.

The unsaturated elastomer blocks are generally formed by the polymerization predominantly of diene monomers.

Alternatively, the unsaturated elastomer blocks may also be formed by the polymerization predominantly of a monomer comprising a linear carbon-carbon double bond and a carbon-carbon double bond of cyclic type, this is the case for example in polynorbornene.

Preferably, conjugated $C_4$-$C_{14}$ dienes can be polymerized or copolymerized in order to form an unsaturated elastomer block.

Preferably, these conjugated dienes are chosen from isoprene, butadiene, piperylene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 2,5-dimethyl-1,3-pentadiene, 2-methyl-1,4-pentadiene, 1,3-hexadiene, 2-methyl-1,3-hexadiene, 2-methyl-1,5-hexadiene, 3-methyl-1,3-hexadiene, 4-methyl-1,3-hexadiene, 5-methyl-1,3-hexadiene, 2,5-dimethyl-1,3-hexadiene, 2,5-dimethyl-2,4-hexadiene, 2-neopentyl-1,3-butadiene, 1,3-cyclopentadiene, methylcyclopentadiene, 2-methyl-1,6-heptadiene, 1,3-cyclohexadiene, 1-vinyl-1,3-cyclohexadiene, and a mixture of these conjugated dienes, and preferably these conjugated dienes are selected from isoprene, butadiene and a mixture containing isoprene and/or butadiene.

According to one variant, the monomers polymerized in order to form an unsaturated elastomer block may be copolymerized, randomly, with at least one other monomer so as to form an unsaturated elastomer block. According to this variant, the molar fraction of polymerized monomer, other than a diene monomer, relative to the total number of units of the unsaturated elastomer block, has to be such that this block retains its unsaturated elastomer properties. Advantageously, the molar fraction of this other comonomer can range from 0 to 50%, more preferentially from 0 to 45% and more preferentially still from 0 to 40%.

By way of illustration, this other monomer capable of copolymerizing with the first monomer can be chosen from ethylenic monomers as defined above (for example ethylene), monomers of vinylaromatic type having from 8 to 20 carbon atoms as defined above, or else it may be a monomer such as vinyl acetate.

Styrene monomers, namely methylstyrenes, para-(tert-butyl)styrene, chlorostyrenes, bromostyrenes, fluorostyrenes or else para-hydroxystyrene, are suitable in particular as vinylaromatic compounds. Preferably, the comonomer of vinylaromatic type is styrene.

Thus, according to one preferred embodiment, the at least one elastomer block may be a random copolymer of styrene-butadiene (SBR) type, it being possible for this copolymer to be hydrogenated. This SBR block preferably has a Tg (glass transition temperature) measured by DSC according to standard ASTM D3418, 1999, of less than 25° C., preferentially less than 10° C., more preferentially less than 0° C. and very preferentially less than −10° C. Also preferentially, the Tg of the SBR block is greater than −100° C. SBR blocks having a Tg of between 20° C. and −70° C., and more particularly between 0° C. and −50° C., are especially suitable. In a well known way, the SBR block comprises a styrene content, a content of 1,2-bonds of the butadiene part and a content of 1,4-bonds of the butadiene part, the latter being composed of a content of trans-1,4-bonds and a content of cis-1,4-bonds when the butadiene part is not hydrogenated. Preferentially, use is especially made of an SBR block having a styrene content for example within a range extending from 10% to 60% by weight, preferably from 20% to 50% by weight, and for the butadiene part, a content of 1,2-bonds within a range extending from 4% to 75% (mol %) and a content of 1,4-bonds within a range extending from 20% to 96% (mol %).

The degree of hydrogenation is determined by NMR analysis. The spectra are acquired on a Bruker Avance 500 MHz spectrometer equipped with a 1H-X 5 mm Cryoprobe. The quantitative $^1$H NMR experiment uses a simple 30° pulse sequence and a repetition time of 5 seconds between each acquisition. 64 accumulations are carried out. The samples (approximately 25 mg) are dissolved in approximately 1 ml of $CS_2$, 100 µl of deuterated cyclohexane are added for locking during acquisition. The chemical shifts are calibrated relative to the protonated impurity of the $CS_2$ 1H δ ppm at 7.18 ppm, with reference to TMS (1H δ ppm at 0 ppm). The $^1$H NMR spectrum makes it possible to quantify the microstructure by integration of the signal peaks characteristic of the various units:

- The styrene originating from the SBR and the polystyrene blocks. It is quantifiable in the aromatics region between 6.0 ppm and 7.3 ppm for 5 protons (with subtraction of the integral of the signal of the $CS_2$ impurity at 7.18 ppm).
- The PB1-2 originating from the SBR. It is quantifiable in the ethylenics region between 4.6 ppm and 5.1 ppm for 2 protons.
- The PB1-4 originating from the SBR. It is quantifiable in the ethylenics region between 5.1 ppm and 6.1 ppm for 2 protons and with deletion of 1 proton of the PB1-2 unit.
- The hydrogenated PB1-2 originating from the hydrogenation, and only having aliphatic protons. The pendent $CH_3$s of the hydrogenated PB1-2 were identified and are quantifiable in the aliphatics region between 0.4 and 0.8 ppm for 3 protons.
- The hydrogenated PB1-4 originating from the hydrogenation, and only having aliphatic protons. It will be deduced by subtracting the aliphatic protons from the various units, considering it for 8 protons.

The microstructure may be quantified in terms of mol % as follows: mol % of a unit=$^1$H integral of a unit/Σ($^1$H integrals of each unit). For example, for a styrene unit: mol % of styrene=CH integral of styrene)/(CH integral of styrene+$^1$H integral of PB1-2+$^1$H integral of PB1-4+$^1$H integral of hydrogenated PB1-2+$^1$H integral of hydrogenated PB1-4).

Depending on the degree of hydrogenation of the SBR block, the content of double bonds in the butadiene part of the SBR block can decrease as far as a content of 0 mol % for a completely hydrogenated SBR block, in which case the corresponding thermoplastic elastomer will be considered to be saturated. Preferably, in the TPEs of use for the requirements of the invention, the SBR elastomer block is hydrogenated such that a proportion ranging from 25 mol % to 100 mol % of the double bonds in the butadiene portion are hydrogenated. More preferentially, from 50 mol % to 100 mol % and very preferentially from 80 mol % to 100 mol % of the double bonds in the butadiene portion are hydrogenated.

Preferably for the invention, the elastomer blocks of the thermoplastic elastomers have, in total, a number-average molecular weight (Mn) ranging from 25 000 g/mol to 350 000 g/mol, preferably from 35 000 g/mol to 250 000 g/mol, so as to confer, on the thermoplastic elastomers, good elastomeric properties and a mechanical strength which is sufficient and compatible with the use as tyre tread.

The elastomer block or blocks can also be blocks comprising several types of ethylenic, diene or styrene monomers as defined above.

Particularly preferably in the invention, the elastomer block or blocks are selected from the group consisting of ethylenic elastomers, polyethers, diene elastomers, the latter optionally being partially or completely hydrogenated, and mixtures of these polymers.

Very particularly preferably in the invention, the elastomer block or blocks are selected from the group consisting of polyisoprenes, polybutadienes, butadiene-isoprene copolymers, polyethers, ethylene-butylene copolymers, styrene-butadiene copolymers, the latter optionally being partially or completely hydrogenated, and mixtures of these polymers.

The elastomer block or blocks may also consist of several elastomer blocks as defined above.

As explained above, the thermoplastic elastomers that can be used according to the invention also comprise at least one thermoplastic block.

A thermoplastic block is understood to mean a block consisting of polymerized monomers and having a glass transition temperature, or a melting point in the case of semicrystalline polymers, above or equal to 80° C., preferably varying from 80° C. to 250° C., more preferentially varying from 80° C. to 200° C., and in particular varying from 80° C. to 180° C.

Indeed, in the case of a semicrystalline polymer, a melting point may be observed which is above the glass transition temperature. In this case, the melting point and not the glass transition temperature is taken into account for the definition above.

The thermoplastic block or blocks may be formed from polymerized monomers of various types.

In Particular, the Thermoplastic Block or Blocks May be Formed of the Following Blocks or of a Mixture of the Following Blocks:

- polyolefins (polyethylene, polypropylene);
- polyurethanes;
- polyamides;
- polyesters;
- polyacetals;
- polyethers (polyethylene oxide, polyphenylene ether);
- polyphenylene sulfides;
- polyfluorinated compounds (FEP, PFA, ETFE);
- polystyrenes (described in detail below);
- polycarbonates;
- polysulfones;
- polymethyl methacrylate;
- polyetherimide;
- thermoplastic copolymers, such as the acrylonitrile-butadiene-styrene (ABS) copolymer.

The Thermoplastic Block or Blocks May Also be Obtained from Monomers Selected from:

- acenaphthylene: those skilled in the art may refer, for example, to the paper by Z. Fodor and J. P. Kennedy, Polymer Bulletin, 1992, 29(6), 697-705;
- indene and its derivatives, such as, for example, 2-methylindene, 3-methylindene, 4-methylindene, dimethylindenes, 2-phenylindene, 3-phenylindene and 4-phenylindene; those skilled in the art may, for example, refer to the patent document U.S. Pat. No. 4,946,899, by the inventors Kennedy, Puskas, Kaszas and Hager, and to the documents J. E. Puskas, G. Kaszas, J. P. Kennedy and W. G. Hager, Journal of Polymer Science, Part A: Polymer Chemistry (1992), 30, 41, and J. P. Kennedy, N. Meguriya and B. Keszler, Macromolecules (1991), 24(25), 6572-6577;

isoprene, then resulting in the formation of a certain number of trans-1,4-polyisoprene units and of units cyclized according to an intramolecular process; those skilled in the art may, for example, refer to the documents G. Kaszas, J. E. Puskas and J. P. Kennedy, Applied Polymer Science (1990), 39(1), 119-144, and J. E. Puskas, G. Kaszas and J. P. Kennedy, Macromolecular Science, Chemistry A28 (1991), 65-80.

According to one variant of the invention, the above monomers may be copolymerized with at least one other monomer as long as this other monomer does not modify the thermoplastic nature of the block, that is to say that the block has a glass transition temperature, or a melting point in the case of semi-crystalline polymers, above or equal to 80° C.

By way of illustration, this other monomer capable of copolymerizing with the polymerized monomer can be chosen from diene monomers, more particularly conjugated diene monomers having from 4 to 14 carbon atoms, and monomers of vinylaromatic type having from 8 to 20 carbon atoms, such as defined in the part relating to the elastomer block.

As explained above, the thermoplastic block or blocks may be selected from polystyrenes and polymers comprising at least one polystyrene block.

Regarding the polystyrenes, these are obtained from styrene monomers.

Styrene monomer should be understood as meaning, in the present description, any monomer comprising styrene, unsubstituted or substituted; mention may be made, among substituted styrenes, for example, of methylstyrenes (for example, o-methylstyrene, m-methylstyrene or p-methylstyrene, α-methylstyrene, α,2-dimethylstyrene, α,4-dimethylstyrene or diphenylethylene), para-(tert-butyl)styrene, chlorostyrenes (for example, o-chlorostyrene, m-chlorostyrene, p-chlorostyrene, 2,4-dichlorostyrene, 2,6-dichlorostyrene or 2,4,6-trichlorostyrene), bromostyrenes (for example, o-bromostyrene, m-bromostyrene, p-bromostyrene, 2,4-dibromostyrene, 2,6-dibromostyrene or 2,4,6-tribromostyrenes), fluorostyrenes (for example, o-fluorostyrene, m-fluorostyrene, p-fluorostyrene, 2,4-difluorostyrene, 2,6-difluorostyrene or 2,4,6-trifluorostyrenes) or else para-hydroxystyrene.

According to a preferential embodiment of the invention, the content by weight of styrene in the thermoplastic elastomers that can be used according to the invention is between 5% and 50%. Below the minimum indicated, there is a risk of the thermoplastic nature of the elastomer being substantially reduced while, above the recommended maximum, the elasticity of the tread can be affected. For these reasons, the styrene content is more preferentially between 10% and 40%.

The thermoplastic block or blocks of the thermoplastic elastomers that can be used according to the invention may also consist of several thermoplastic blocks as defined above.

The proportion of thermoplastic blocks in the thermoplastic elastomers that can be used according to the invention is determined, on the one hand, by the thermoplasticity properties that the thermoplastic elastomers must have.

The thermoplastic block or blocks are preferentially present in sufficient proportions to preserve the thermoplastic nature of the thermoplastic elastomers that can be used according to the invention. The minimum content of thermoplastic blocks in the thermoplastic elastomers may vary as a function of the conditions of use of the thermoplastic elastomers.

On the other hand, the ability of the thermoplastic elastomers to deform during the preparation of the tyre can also contribute to determining the proportion of the thermoplastic blocks in the thermoplastic elastomers that can be used according to the invention.

Preferably, the thermoplastic blocks of the thermoplastic elastomers have, in total, a number-average molecular weight (Mn) ranging from 5000 g/mol to 150 000 g/mol, so as to confer, on the thermoplastic elastomers, good elastomeric properties and a mechanical strength which is sufficient and compatible with the use as tyre tread.

Particularly preferably in the invention, the thermoplastic block or blocks are selected from the group consisting of polystyrenes, polyesters, polyamides, polyurethanes, and mixtures of these polymers.

Very particularly preferably in the invention, the thermoplastic block or blocks are selected from the group consisting of polystyrenes, polyesters, polyamides, and mixtures of these polymers.

As thermoplastic elastomer that can be used according to the invention, mention may be made, in a first particular embodiment of the invention, of a copolymer, the elastomer part of which is saturated, and which comprises styrene blocks and alkylene blocks.

The alkylene blocks are preferably of ethylene, propylene or butylene.

More preferentially in this first particular embodiment, the thermoplastic elastomers that can be used according to the invention are selected from the following linear or star-branched, diblock or triblock copolymers: styrene/ethylene/butylene (SEB), styrene/ethylene/propylene (SEP), styrene/ethylene/ethylene/propylene (SEEP), styrene/ethylene/butylene/styrene (SEBS), styrene/ethylene/propylene/styrene (SEP S), styrene/ethylene/ethylene/propylene/styrene (SEEPS), styrene/isobutylene (SIB), styrene/isobutylene/styrene (SIBS) and the mixtures of these copolymers.

According to a second particular embodiment, the thermoplastic elastomers that can be used according to the invention are copolymers, the elastomer part of which is unsaturated and which comprises styrene blocks and diene blocks, these diene blocks being in particular isoprene or butadiene blocks.

More preferentially in this second particular embodiment, these thermoplastic elastomers are selected from the following linear or star-branched, diblock or triblock copolymers: styrene/butadiene (SB), styrene/isoprene (SI), styrene/butadiene/isoprene (SBI), styrene/butadiene/styrene (SBS), styrene/isoprene/styrene (SIS), styrene/butadiene/isoprene/styrene (SBIS), styrene/optionally hydrogenated butadiene-styrene copolymer/styrene (SOE), styrene/partially hydrogenated butadiene/styrene (SBBS) and mixtures of these copolymers.

According to a third particular embodiment, the thermoplastic elastomers that can be used according to the invention are linear or star-branched copolymers, the elastomer part of which comprises a saturated part and an unsaturated part, such as, for example, styrene/butadiene/butylene (SBB), styrene/butadiene/butylene/styrene (SBBS) or a mixture of these copolymers.

According to a fourth particular embodiment, the thermoplastic elastomers that can be used according to the invention are multiblock thermoplastic elastomers.

In particular, mention may be made of the copolymers comprising random copolymer blocks of ethylene and propylene/polypropylene, polybutadiene/polyurethane (TPU), polyether/polyester (COPE) or polyether/polyamide (PEBA).

The polyether blocks are preferentially polyethylene glycols.

Very preferentially, the thermoplastic elastomer or elastomers that can be used according to the invention are selected from the group consisting of styrene/ethylene/butylene/styrene (SEBS), polyether/polyester (COPE), polyether/polyamide (PEBA), styrene/butadiene/styrene (SBS), styrene/isoprene/styrene (SIS), styrene/butadiene/isoprene/styrene (SBIS), styrene/optionally hydrogenated butadiene-styrene copolymer/styrene (SOE), styrene/partially hydrogenated butadiene/styrene (SBBS) block copolymers and mixtures of these copolymers.

Mention may be made, as examples of thermoplastic elastomers that are commercially available and that can be used according to the invention, of the elastomers of SEPS, SEEPS or SEBS type sold by Kraton under the Kraton G name (for example 61650, 61651, 61654 and 61730 products) or Kuraray under the Septon name (for example Septon 2007, Septon 4033, Septon 004, Septon 8076 or Septon V9827); or the elastomers of SIS type sold by Kuraray under the name Hybrar 5125 or sold by Kraton under the name D1161, or else the elastomers of linear SBS type sold by Polimeri Europa under the name Europrene SOLT 166 or of star-branched SBS type sold by Kraton under the name D1184. Mention may also be made of the elastomers sold by Dexco Polymers under the name Vector (for example Vector 4114 or Vector 8508).

Mention may also be made of the elastomers of the SOE type (S-(hydrogenated) SBR-S sold by Asahi Kasei under the name "SOE L606".

Mention may be made, among multiblock thermoplastic elastomers, of the Vistamaxx thermoplastic elastomer sold by Exxon; the COPE thermoplastic elastomer sold by DSM under the Amitel name or by DuPont under the Hytrel name or by Ticona under the Riteflex name; the PEBA thermoplastic elastomer sold by Arkema under the PEBAX name; or the TPU thermoplastic elastomer sold by Sartomer under the name TPU 7840 or by BASF under the Elastogran name.

It is also possible for the thermoplastic elastomers given as example above to be mixed with one another within the tread that can be used according to the invention.

It is also possible for the thermoplastic elastomers presented above to be in a mixture with other non-thermoplastic elastomers.

In such a case, the thermoplastic elastomer or elastomers constitute the predominant fraction by weight; they then represent at least 50% by weight, preferably at least 65% by weight, more preferentially at least 70% by weight, and in particular at least 75% by weight of all of the elastomers present in the elastomeric matrix of the tread.

More preferentially, the thermoplastic elastomer or elastomers represent at least 95%, in particular 100%, by weight of all of the elastomers present in the elastomeric matrix of the tread.

Thus, the thermoplastic elastomer content of the elastomeric matrix of the tread preferably ranges from 65 to 100 phr, more preferentially from 70 to 100 phr, even more preferentially from 75 to 100 phr, and in particular from 95 to 100 phr.

Particularly preferably, the thermoplastic elastomer or elastomers that can be used according to the invention are the only elastomers of the elastomeric matrix of the tread.

The thermoplastic elastomer or elastomers described above are sufficient by themselves for the tread according to the invention to be usable.

However, in the case where the thermoplastic elastomers are mixed with non-thermoplastic elastomers, the tread according to the invention may then comprise one or more diene rubbers as non-thermoplastic elastomer.

A "diene" elastomer or rubber should be understood, in a known manner, as meaning one or more elastomers resulting at least in part (i.e. a homopolymer or a copolymer) from diene monomers (monomers bearing two conjugated or non-conjugated carbon-carbon double bonds).

These diene elastomers can be classified into two categories: "essentially unsaturated" or "essentially saturated".

"Essentially unsaturated" is generally intended to mean a diene elastomer resulting at least in part from conjugated diene monomers having a content of units of diene origin (conjugated dienes) which is greater than 15% (mol %). In the category of "essentially unsaturated" diene elastomers, a "highly unsaturated" diene elastomer is intended in particular to mean a diene elastomer having a content of units of diene origin (conjugated dienes) which is greater than 50%.

Thus it is that diene elastomers such as some butyl rubbers or copolymers of dienes and of α-olefins of EPDM type can be described as "essentially saturated" diene elastomers (low or very low content of units of diene origin, always less than 15%).

Given these Definitions, Diene Elastomer, Regardless of the Above Category, Capable of being Used in the Tread that can be Used According to the Invention, is Understood More Particularly to Mean:
(a)—any homopolymer obtained by polymerization of a conjugated diene monomer having from 4 to 12 carbon atoms;
(b)—any copolymer obtained by copolymerization of one or more conjugated dienes with one another or with one or more vinylaromatic compounds having from 8 to 20 carbon atoms;
(c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;
(d)—a copolymer of isobutene and isoprene (diene butyl rubber) and also the halogenated versions, in particular chlorinated or brominated versions, of this type of copolymer.

The following are especially suitable as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, aryl-1,3-butadienes, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers of the diene elastomers may contain between 99% and 20% by weight of diene units and between 1% and 80% by weight of vinylaromatic units. The diene elastomers can have any microstructure, which depends on the polymerization conditions used, especially on the presence or absence of a modifying and/or randomizing agent and on the amounts of modifying and/or randomizing agent employed. The elastomers can, for example, be prepared in dispersion or in solution; they can be coupled and/or star-branched or else functionalized with a coupling and/or star-branching or functionalization agent. For coupling with carbon black, mention may be made, for example, of functional groups comprising a C—Sn bond or amino functional groups, such as benzophenone, for example; for coupling to a reinforcing inorganic filler such as silica, mention may be made, for example, of silanol functional groups or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973). Mention may also be made, as other examples of functionalized elastomers, of elastomers (such as SBR, BR, NR or IR) of the epoxidized type.

As explained previously, the tread that may be used in the tyre according to the invention comprises a crosslinking system based on one or more peroxides.

The term "based on" should be understood as meaning that the crosslinking system includes a mixture and/or the product of reaction of the various constituents used in the crosslinking system, in particular the peroxide(s), some of these base constituents being capable of reacting, or intended to react, with each other or with the other constituents of the tread, at least partly, during the various phases of manufacture of the tread, in particular during its crosslinking.

The peroxide(s) that may be used according to the invention may be any peroxide known to those skilled in the art.

Preferably, the peroxide(s) that may be used according to the invention are chosen from organic peroxides.

Particularly preferably, the peroxide(s) that may be used according to the invention are chosen from dialkyl peroxides such as di-tert-butyl peroxide (DTBP); dicumyl peroxide; tert-butylcumyl peroxide and 2,5-dimethyl-2,5-bis(tert-butylperoxy)hexane (DBPH), diacyl peroxides such as bis(2,4-dichlorobenzoyl) peroxide (DCBP-50) and benzoyl peroxide (BP-50), acetal peroxides such as ethyl 3,3-bis(t-butylperoxy)butyrate), ester peroxides such as t-butyl peroxybenzoate and 00-(t-butyl)O-(2-ethylhexyl) monoperoxycarbonate, hydroperoxides such as t-amyl hydroperoxide, and mixtures of these compounds.

Most particularly preferably, the peroxide(s) that may be used according to the invention are chosen from dicumyl peroxide, 2,5-dimethyl-2,5-bis(tert-butylperoxy)hexane, and mixtures of these compounds.

Bis(2,4-dichlorobenzoyl) peroxide or DCBP-50 is sold especially under the commercial reference Perkadox PD-50S-ps-a by the company AkzoNobel Chemical B.V. or Luperox CST by the company Arkema.

Benzoyl peroxide or BP-50 is sold especially under the commercial reference Perkadox L-50S-ps by the company AkzoNobel Chemical B.V.

Dicumyl peroxide is sold especially under the commercial reference Di-Cup 40C by the company Geo Specialty Chemicals, Inc. or Varox DCP-40C by the company R.T. Vanderbilt Company, Inc. or Dicup by the company Hercules Powder Co.

2,5-Dimethyl-2,5-bis(tert-butylperoxy)hexane or DBPH is sold especially under the commercial reference Varox DBPH-50 by the company R.T. Vanderbilt Company, Inc. or Luperox 101 by the company Arkema or Trigonox 101 by the company AkzoNobel Chemical B.V.

Di-tert-butyl peroxide or DTBP is sold especially under the commercial reference Luperox DI by the company Arkema.

The peroxide content of the tread according to the invention generally ranges from 0.1 to 10 phr, preferably ranges from 0.2 to 6 phr, more preferentially ranges from 0.5 to 5 phr (parts by weight per hundred parts by weight of the elastomer).

The reason for this is that below an amount of 0.1 phr, the effect of the peroxides may not be appreciable, whereas above 10 phr, the resistance properties of the composition may be diminished.

Among the other crosslinking agents usually used by a person skilled in the art, mention may be made of sulfur, sulfur-donating agents with, for example, dipentamethylenethiuram tetrasulfide (DPTT), polymeric sulfur or caprolactam disulfide (CLD).

Preferably, the tread contains less than 0.3 phr, more preferentially less than 0.1 phr of molecular sulfur or of sulfur donor, and even more preferentially, the tread does not contain any molecular sulfur or sulfur donor.

The crosslinking system may also comprise one or more vulcanization accelerators. Preferably, the tread does not contain any vulcanization accelerators.

The tread that can be used according to the invention may also comprise a reinforcing filler.

In particular, use may be made of any type of filler commonly used for the manufacture of tyres, for example an organic filler, such as carbon black, an inorganic filler, such as silica, or else a blend of these two types of filler, especially a blend of carbon black and silica.

All the carbon blacks conventionally used in tyres ("tyre-grade" blacks) are suitable as carbon blacks. Mention will more particularly be made, for example, of the reinforcing carbon blacks of the 100, 200 or 300 series (ASTI grades), such as, for example, the N115, N134, N234, N326, N330, N339, N347 or N375 blacks, or else, depending on the applications targeted, the blacks of higher series (for example N660, N683 or N772), indeed even N990.

"Reinforcing inorganic filler" should be understood, in the present patent application, by definition, as meaning any inorganic or mineral filler (whatever its colour and its origin, natural or synthetic), also known as "white filler", "clear filler" or indeed even "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, the term "reinforcing inorganic filler" is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are especially suitable as reinforcing inorganic fillers. The silica used may be any reinforcing silica known to those skilled in the art, in particular any precipitated or fumed silica having a BET specific surface area and a CTAB specific surface area which are both less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in application WO 03/16837.

In order to couple the reinforcing inorganic filler to the elastomer, it is possible, for example, to use, in a known way, an at least bifunctional coupling agent (or bonding agent) intended to provide a satisfactory connection, of chemical and/or physical nature, between the inorganic filler (surface of its particles) and the elastomer, in particular bifunctional organosilanes or polyorganosiloxanes.

The content by volume of optional reinforcing filler in the tread (carbon black and/or reinforcing inorganic filler, such as silica) is within a range extending from 0 to 30%, which corresponds approximately to a content of 0 to 100 phr for a plasticizer-free tread. Preferentially, the tread that can be used according to the invention comprises less than 30 phr of reinforcing filler and more preferentially less than 10 phr.

According to a preferential variant of the invention, the tread does not contain reinforcing filler.

In the same way, the tread that can be used according to the invention may contain one or more inert micrometric fillers, such as the platy fillers known to a person skilled in the art.

Preferably, the tread that can be used according to the invention does not contain a micrometric filler.

The thermoplastic elastomer or elastomers described above are sufficient by themselves for the tread according to the invention to be usable.

Nonetheless, according to one preferential embodiment of the invention, the tread may also comprise at least one plasticizing agent, such as an oil (or a plasticizing oil or extender oil), or a plasticizing resin, the role of which is to facilitate the processing of the tread, in particular its incorporation in the tyre, by lowering the modulus and increasing the tackifying power.

Use may be made of any oil, preferably having a weakly polar nature, capable of extending or plasticizing elastomers, especially thermoplastic elastomers. At ambient temperature (23° C.), these oils, which are more or less viscous, are liquids (that is to say, as a reminder, substances which have the ability to eventually assume the shape of their container), in contrast especially to resins or rubbers, which are by nature solids. Use may also be made of any type of plasticizing resin known to those skilled in the art.

For example, the extender oil is selected from the group consisting of liquid paraffins, such as a low viscosity liquid paraffin (LVPO).

Thus, in one particular embodiment of the present invention, the at least one plasticizing agent is a liquid paraffin.

A person skilled in the art will know, in the light of the description and implementational examples which follow, how to adjust the amount of plasticizer as a function of the thermoplastic elastomers used (as indicated above) and of the specific conditions of use of the tyre provided with the tread.

When it is used, it is preferred that the content of extender oil be within a range varying from 0 to 80 phr, preferentially from 0 to 50 phr, more preferentially from 5 to 50 phr, depending on the glass transition temperature and the modulus which are targeted for the tread.

The tread described above can furthermore comprise the various additives normally present in the treads known to those skilled in the art. The choice will be made, for example, of one or more additives chosen from protection agents, such as antioxidants or antiozonants, UV stabilizers, various processing aids or other stabilizers, or else promoters capable of promoting the adhesion to the remainder of the structure of the pneumatic article.

Preferably, the tread does not contain an antioxidant agent.

Particularly preferably, the tread does not contain all these additives at the same time and, more preferentially still, the tread does not contain any of these agents.

In addition to the elastomers described above, the composition of the tread could also comprise, in a minor fraction by weight with respect to the thermoplastic elastomers, polymers other than elastomers, such as, for example, thermoplastic polymers. When they are present in the tread, it is preferable for the total content of non-elastomeric thermoplastic polymers to be less than 40 phr, preferentially between 5 and 30 phr and more preferentially between 10 and 25 phr.

These thermoplastic polymers can in particular be poly(para-phenylene ether) polymers (denoted by the abbreviation "PPE"). These PPE thermoplastic polymers are well known to a person skilled in the art; they are resins which are solid at ambient temperature (20° C.) and are compatible with styrene polymers, which are in particular used to increase the glass transition temperature of thermoplastic elastomers, the thermoplastic block of which is a styrene block (see, for example, "Thermal, Mechanical and Morphological Analyses of Poly(2,6-dimethyl-1,4-phenylene oxide)/Styrene-Butadiene-Styrene Blends", Tucker, Barlow and Paul, Macromolecules, 1988, 21, 1678-1685).

Preferentially, the tread does not comprise any non-elastomeric thermoplastic polymers.

This tread may be mounted on a tyre in a conventional way, said tyre comprising, in addition to the tread, a crown, two sidewalls and two beads, a carcass reinforcement anchored to the two beads, and a crown reinforcement.

Optionally, the tyre according to the invention may also comprise an underlayer or an adhesion layer between the patterned portion of the tread and the crown reinforcement.

In general, the tyre according to the invention is intended to equip motor vehicles of private passenger type, SUVs (sport utility vehicles), two-wheeled vehicles (especially motorbikes), aeroplanes, and also industrial vehicles such as vans, heavy-goods vehicles and other transportation or material-handling vehicles.

Heavy-duty vehicles may especially comprise underground trains, buses and heavy road transport vehicles such as lorries, tractors, trailers and off-road vehicles, such as agricultural or civil engineering vehicles.

The tread that can be used according to the invention has the distinctive feature of being crosslinked.

Thus, the crosslinking enables improved high-temperature stiffness to be imparted to the tread.

Consequently, the present invention also relates to a process for preparing a tyre as defined above, comprising the following steps:

extruding the tread or blending in an internal or external mixer of the tread with or without the crosslinking system, it being understood that when the blending of the tread is performed without the crosslinking system, the crosslinking system is introduced subsequently into the internal or external mixer, then placing the extruded or calendered tread on the tyre, then curing the tyre.

Thus, in a first embodiment of the process according to the invention the tread of the tyre is firstly prepared in the conventional way, by incorporation of the various components in a twin-screw extruder, so as to melt the matrix and incorporate all the ingredients, followed by use of a die which makes it possible to produce the profiled element.

The various components of the tread are in particular the thermoplastic elastomers seen above which are available for example in the form of beads or pellets and the crosslinking system.

The tread is then placed on the tyre.

The tyre is then cured. The tread is then generally patterned in the mould for curing the tyre.

In a second embodiment of the process according to the invention, the tyre tread is first prepared by blending in an internal or external mixer the tread with or without the crosslinking system.

When the blending of the tread is performed without the crosslinking system, said system is then introduced into the internal or external mixer so as to melt the matrix and incorporate all of the ingredients, followed by use of a die for producing the profile or use of a calender for obtaining a flat strip.

When the blending of the tread is performed without the crosslinking system, said system is preferably introduced as late as possible into the mixture to reduce the residence time and at a temperature that is compatible with the decomposition of the peroxide so as not to crosslink too early during the transformation phase.

The following steps of the process according to the invention are the same as in the first embodiment.

The invention and its advantages will be more thoroughly understood in the light of the single FIGURE and exemplary embodiments that follow.

The appended single FIGURE represents diagrammatically (without observing a specific scale) a radial cross section of a tyre in accordance with the invention.

This tyre 1 comprises a reinforced crown 2 comprising a tread 3 (in order to simplify, having a very simple structure), the radially outer part (3a) of which is intended to come into contact with the road, two inextensible beads 4 in which a carcass reinforcement 6 is anchored. The crown 2, joined to said beads 4 by two sidewalls 5, is, in a manner known per se, reinforced by a crown reinforcement or "belt" 7 which is at least partly metallic and which is radially outer with respect to the carcass reinforcement 6.

More specifically, a tyre belt is generally composed of at least two superimposed belt plies, sometimes referred to as "working" plies or "crossed" plies, the reinforcing elements or "reinforcers" of which are positioned virtually parallel to one another inside a ply, but crossed from one ply to the other, that is to say inclined, symmetrically or asymmetrically, with respect to the median circumferential plane, by an angle which is generally between 10° and 45°, according to the type of tyre under consideration. Each of these two crossed plies is composed of a rubber matrix or "calendering rubber" which coats the reinforcers. In the belt, the crossed plies can be supplemented by various other auxiliary rubber plies or layers, with widths which can vary as the case may be, comprising or not comprising reinforcers; mention will be made, by way of example, of simple rubber cushions, "protection" plies having the role of protecting the remainder of the belt from external attacks or perforations, or else "hooping" plies comprising reinforcers oriented substantially along the circumferential direction ("zero-degree" plies), whether radially outer or inner with respect to the crossed plies.

For the reinforcing of the above belts, in particular of their crossed plies, protection plies or hooping plies, use is generally made of reinforcers in the form of steel cords or textile cords composed of thin threads assembled together by braiding or twisting.

The carcass reinforcement 6 is here anchored in each bead 4 by winding around two bead wires (4a, 4b), the turn-up (6a, 6b) of this reinforcement 6 being, for example, positioned towards the outside of the tyre 1, which is here depicted mounted on its rim 8. The carcass reinforcement 6 is composed of at least one ply reinforced by radial textile cords, that is to say that these cords are positioned virtually parallel to one another and extend from one bead to the other so as to form an angle of between 80° and 90° with the median circumferential plane (plane perpendicular to the axis of rotation of the tyre which is located halfway between the two beads 4 and passes through the middle of the crown reinforcement 7). Of course, this tyre 1 additionally comprises, in a known manner, a layer 9 of inner rubber or elastomer (commonly known as "inner liner") which defines the radially inner face of the tyre and which is intended to protect the carcass ply from the diffusion of air originating from the space interior to the tyre.

Measurement Method

Measurement of G'(T) (Elastic Shear Modulus)

The method of measurement of G'(T) uses an RPA 2000LV rheology device (oscillating disc rheometer) equipped with the standard 200 in.lbs (22.6 Nm) viscosity sensor. The RPA device makes it possible to stress in torsion a sample of material enclosed in a chamber having biconical walls.

In order to carry out the measurement, a sample of material having a diameter of approximately 30 mm and a weight of approximately 5 g is deposited in the chamber of the RPA (a total volume of 8 cm$^3$ is regarded as optimal; the amount is sufficient when a small amount of sample escapes from each side of the chamber and is visible at the end of the test). Preferably, the material is cut out beforehand from a sheet of this material. In the case where this sheet of material is insufficiently thick, it is possible to stack the sections of this sheet of material.

In a first stage, the optimum crosslinking time T95 at 170° C. for the sample is determined using an RPA 200LV rheometer according to the standard DIN 53529-part 3 (June 1983). The change in the rheometric torque, Atorque, as a function of time describes the change in stiffness of the composition following the vulcanization reaction. The measurements are treated according to the standard DIN 53529-part 2 (March 1983): Tα (for example T95) is the time required to reach a conversion of a %, i.e. a % (for example 95%) of the difference between the minimum and maximum torques.

Secondly, a shaping operation is carried out, by applying to the sample enclosed in the chamber a temperature of 170° C. for the time T95, defined in the first step, with a peak-to-peak strain of 2.8% at 1.7 Hz.

At the end of this operation, the sample is completely moulded in the closed chamber of the RPA. The sample is subsequently cooled to 40° C. directly in the chamber of the RPA. It is then possible to begin the measurement of the value of G' at 5% peak-to-peak strain and 10 Hz within a temperature range varying from 40 to 200° C. (ramp: 3° C./min).

A curve of variation in G' as a function of the temperature is obtained, from which the G' moduli of the composition at 40° C. and 200° C. can be extracted.

The forming step and G' measurement step are carried out without intervention, by programming the RPA device.

Finally, the ratio G'(200° C.)/G'(40° C.) is calculated.

The higher this ratio, the better the conservation of the mechanical properties with respect to temperature.

EXAMPLES

Example 1: Tyre Based on an SIS Thermoplastic Elastomer (Kraton D1161)

A comparative tread composition A0 and tread compositions that may be used in a tyre according to the invention A1 to A4 were prepared by blending in an internal mixer of the tread without the crosslinking system (peroxide) and then introduction into the external mixer of the crosslinking system, on the basis of table 1 below. The values are indicated in phr.

TABLE 1

|  | Tread | | | | |
| --- | --- | --- | --- | --- | --- |
|  | A0 | A1 | A2 | A3 | A4 |
| SIS[1] | 100 | 100 | 100 | 100 | 100 |
| Dicumyl peroxide | — | 1.7 | 3.4 | 5.1 | — |
| 2,5-dimethyl-2,5-di(t-butylperoxy)hexane[2] | — | — | — | — | 1.8 |

[1]SIS thermoplastic elastomer, Kraton D1161, from Kaneka;
[2]Luperox 101 from Arkema.

The G'(T) moduli at 40° C. and 200° C. of the treads A0 to A4 were measured.

The results are presented in Table 2 below.

TABLE 2

| Tread | Ratio (G'(200° C.)/G'(40° C.)) × 100 | Ratio (G'(200° C.)/G'(40° C.)) in % relative to A0 |
| --- | --- | --- |
| A0 | 8.8 | 100 |
| A1 | 99.0 | 1126 |
| A2 | 112.9 | 1284 |
| A3 | 125.6 | 1429 |
| A4 | 104.5 | 1189 |

It is found that all the formulations containing a peroxide show an improvement in the heat resistance.

Example 2: Tyre Based on an SIS Thermoplastic Elastomer (Hybrar 5125 from the Company Kuraray)

A comparative tread composition B0 and tread compositions that may be used in a tyre according to the invention B1 to B4 were prepared by blending in an internal mixer the tread without the crosslinking system (peroxide) followed by introduction into the external mixer of the crosslinking system, on the basis of table 3 below. The values are indicated in phr.

TABLE 3

|  | Tread | | | |
| --- | --- | --- | --- | --- |
|  | B0 | B1 | B2 | B3 |
| SIS[1] | 100 | 100 | 100 | 100 |
| Dicumyl peroxide | — | 1.6 | 3.2 | — |
| 2,5-Dimethyl-2,5-bis(t-butylperoxy)hexane[2] | — | — | — | 1.7 |

[1]SIS thermoplastic elastomer Hybrar 5125 from the company Kuraray
[2]Luperox 101 from the company Arkema The moduli G'(T) at 40° C. and 200° C. of the treads B0 to B3 were measured.

The results are presented in table 4 below.

TABLE 4

| Tread | Ratio (G'(200° C.)/G'(40° C.)) × 100 | Ratio (G'(200° C.)/G'(40° C.)) in % relative to B0 |
| --- | --- | --- |
| B0 | 3.9 | 100 |
| B1 | 21.7 | 552 |
| B2 | 20.0 | 509 |
| B3 | 21.3 | 542 |

It is found that all the formulations containing a peroxide show an improvement in the heat resistance.

Example 3: Tyre Based on an S-SBR(Hydrogenated)-S Thermoplastic Elastomer

A comparative tread composition C0 and tread compositions that may be used in a tyre according to the invention C1 to C4 were prepared by blending in an internal mixer the tread without the crosslinking system (peroxide) followed by introduction into the external mixer of the crosslinking system, on the basis of table 5 below. The values are indicated in phr.

TABLE 5

|  | Tread | | | | |
| --- | --- | --- | --- | --- | --- |
|  | C0 | C1 | C2 | C3 | C4 |
| S-SBS-S[1] | 100 | 100 | 100 | 100 | 100 |
| Dicumyl peroxide | — | 1 | 2 | 3 | — |
| 2,5-Dimethyl-2,5-bis(t-butylperoxy)hexane[2] | — | — | — | — | 1.1 |

[1]S-SBS(hydrogenated)-S thermoplastic elastomer SOE L606 from the company Asahi Kasei
[2]Luperox 101 from the company Arkema The moduli G'(T) at 40° C. and 200° C. of the treads C0 to C4 were measured.

The results are presented in table 6 below.

TABLE 6

| Tread | Ratio (G'(200° C.)/G'(40° C.)) × 100 | Ratio (G'(200° C.)/G'(40° C.)) in % relative to C0 |
|---|---|---|
| C0 | 9.4 | 100 |
| C1 | 18.0 | 191 |
| C2 | 26.1 | 277 |
| C3 | 42.2 | 447 |
| C4 | 18.7 | 198 |

It is found that all the formulations containing a peroxide show an improvement in the heat resistance.

Example 4: Tyre Based on an SEBS Thermoplastic Elastomer

A comparative tread composition D0 and tread compositions that may be used in a tyre according to the invention D1 to D4 were prepared by blending in an internal mixer the tread without the crosslinking system (peroxide) followed by introduction into the external mixer of the crosslinking system, on the basis of table 7 below. The values are indicated in phr.

TABLE 7

| | Tread | | | | |
|---|---|---|---|---|---|
| | D0 | D1 | D2 | D3 | D4 |
| SEBS[1] | 100 | 100 | 100 | 100 | 100 |
| Dicumyl peroxide | — | 1.4 | 2.8 | 4.2 | — |
| 2,5-Dimethyl-2,5-bis(t-butylperoxy)hexane[2] | — | — | — | — | 1.5 |

[1]SEBS thermoplastic elastomer Septon 8076 from the company Kuraray
[2]Luperox 101 from the company Arkema The moduli G'(T) at 40° C. and 200° C. of the treads D0 to D4 were measured.

The results are presented in table 8 below.

TABLE 8

| Tread | Ratio (G'(200° C.)/G'(40° C.)) × 100 | Ratio (G'(200° C.)/G'(40° C.)) in % relative to D0 |
|---|---|---|
| D0 | 0.7 | 100 |
| D1 | 2.0 | 281 |
| D2 | 6.1 | 877 |
| D3 | 10.6 | 1515 |
| D4 | 2.8 | 397 |

It is found that all the formulations containing a peroxide show an improvement in the heat resistance.

Example 5: Tyre Based on an SEBS Thermoplastic Elastomer

A comparative tread composition E0 and tread compositions that may be used in a tyre according to the invention E1 to E4 were prepared by blending in an internal mixer the tread without the crosslinking system (peroxide) followed by introduction into the external mixer of the crosslinking system, on the basis of table 9 below. The values are indicated in phr.

TABLE 9

| | Tread | | | | |
|---|---|---|---|---|---|
| | E0 | E1 | E2 | E3 | E4 |
| SEBS[1] | 100 | 100 | 100 | 100 | 100 |
| Dicumyl peroxide | — | 1.4 | 2.8 | 4.2 | — |
| 2,5-Dimethyl-2,5-bis(t-butylperoxy)hexane[2] | — | — | — | — | 1.5 |

[1]SEBS thermoplastic elastomer Septon V9827 from the company Kuraray
[2]Luperox 101 from the company Arkema The moduli G'(T) at 40° C. and 200° C. of the treads E0 to E4 were measured.

The results are presented in table 10 below.

TABLE 10

| Tread | Ratio (G'(200° C.)/G'(40° C.)) × 100 | Ratio (G'(200° C.)/G'(40° C.)) in % relative to E0 |
|---|---|---|
| E0 | 3.6 | 100 |
| E1 | 11.2 | 307 |
| E2 | 19.4 | 534 |
| E3 | 31.4 | 863 |
| E4 | 14.8 | 407 |

It is found that all the formulations containing a peroxide show an improvement in the heat resistance.

Thus, these results for five types of thermoplastic elastomers reveal much less flow at high temperature for the treads comprising a peroxide relative to a comparative tread not comprising any.

Thus, it is found that the treads comprising a peroxide show an improvement in the heat resistance relative to treads not comprising any.

The invention claimed is:

1. A tire comprising a tread, a crown with a crown reinforcement, two sidewalls, two beads, a carcass reinforcement anchored to the two beads and extending from one sidewall to the other,
   wherein the tread comprises:
   (a) an elastomeric matrix comprising at least 50% by weight of at least one thermoplastic elastomer comprising at least one elastomer block and at least one thermoplastic block, relative to all of the elastomers present in the elastomeric matrix of the tread,
      wherein the at least one thermoplastic elastomer is a triblock copolymer comprising thermoplastic block/elastomer block/thermoplastic block; and
   (b) a crosslinking system based on at least one peroxide, wherein the peroxide content ranges from 0.1 to 10 phr.

2. The tire according to claim 1, wherein the at least one thermoplastic elastomer has a glass transition temperature below or equal to 25° C.

3. The tire according to claim 2, wherein the at least one thermoplastic elastomer has a glass transition temperature below or equal to 10° C.

4. The tire according to claim 1, wherein the number-average molecular weight of the at least one thermoplastic elastomer is between 30,000 and 500,000 g/mol.

5. The tire according to claim 4, wherein the number-average molecular weight of the at least one thermoplastic elastomer is between 40,000 and 400,000 g/mol.

6. The tire according to claim 5, wherein the number-average molecular weight of the at least one thermoplastic elastomer is between 50,000 and 300,000 g/mol.

7. The tire according to claim 1, wherein the at least one elastomer block of the at least one thermoplastic elastomer is selected from the group consisting of ethylenic elastomers, polyethers, partially hydrogenated diene elastomers, completely hydrogenated diene elastomers, and mixtures thereof.

8. The tire according to claim 7, wherein the at least one elastomer block of the at least one thermoplastic elastomer is selected from the group consisting of polyisoprenes, polybutadienes, butadiene-isoprene copolymers, polyethers, ethylene-butylene copolymers, partially hydrogenated styrene-butadiene copolymers, completely hydrogenated styrene-butadiene copolymers, and mixtures thereof.

9. The tire according to claim 1, wherein the at least one thermoplastic block of the at least one thermoplastic elastomer is selected from the group consisting of polyolefins, polyurethanes, polyamides, polyesters, polyacetals, polyethers, polyphenylene sulfides, polyfluorinated compounds, polystyrenes, polycarbonates, polysulfones, polymethyl methacrylate, polyetherimide, thermoplastic copolymers, and mixtures thereof.

10. The tire according to claim 1, wherein the at least one thermoplastic block of the at least one thermoplastic elastomer is selected from the group consisting of polystyrenes, polyesters, polyamides, polyurethanes, and mixtures thereof.

11. The tire according to claim 10, wherein the at least one thermoplastic block of the at least one thermoplastic elastomer is selected from the group consisting of polystyrenes, polyesters, polyamides, and mixtures thereof.

12. The tire according to claim 1, wherein the at least one thermoplastic elastomer is selected from the group consisting of styrene/ethylene/butylene/styrene (SEBS), polyether/polyester (COPE), polyether/polyamide (PEBA), styrene/butadiene/styrene (SBS), styrene/isoprene/styrene (SIS), styrene/butadiene/isoprene/styrene (SBIS), styrene/optionally hydrogenated butadiene-styrene copolymer/styrene (SOE), styrene/partially hydrogenated butadiene/styrene (SBBS) block copolymers, and mixtures thereof.

13. The tire according to claim 1, wherein the thermoplastic elastomer content of the elastomeric matrix of the tread varies from 65 to 100 phr.

14. The tire according to claim 13, wherein the thermoplastic elastomer content of the elastomeric matrix of the tread varies from 70 to 100 phr.

15. The tire according to claim 14, wherein the thermoplastic elastomer content of the elastomeric matrix of the tread varies from 75 to 100 phr.

16. The tire according to claim 15, wherein the thermoplastic elastomer content of the elastomeric matrix of the tread varies from 95 to 100 phr.

17. The tire according to claim 1, wherein the at least one thermoplastic elastomer is the only elastomer in the elastomeric matrix of the tread.

18. The tire according to claim 1, wherein the at least one peroxide is selected from the group consisting of dialkyl peroxides, diacyl peroxides, acetal peroxides, ester peroxides, hydroperoxides and mixtures thereof.

19. The tire according to claim 18, wherein the at least one peroxide is selected from the group consisting of dicumyl peroxide, 2,5-dimethyl-2,5-bis(tert-butylperoxy)hexane, and mixtures thereof.

20. The tire according to claim 1, wherein the peroxide content of the tread ranges from 0.2 to 6 phr.

21. The tire according to claim 1, wherein the peroxide content of the tread ranges from 0.5 to 5 phr.

22. The tire according to claim 1, wherein the tread additionally comprises at least one plasticizing agent.

23. The tire according to claim 22, wherein the at least one plasticizing agent is selected from the group consisting of plasticizing resins and plasticizing oils.

24. The tire according to claim 22, wherein the at least one plasticizing agent is a liquid paraffin.

25. The tire according to claim 1, wherein the tread contains less than 0.3 phr of molecular sulfur or a sulfur donor.

26. The tire according to claim 25, wherein the tread contains less than 0.1 phr of molecular sulfur or a sulfur donor.

27. The tire according to claim 1, wherein the tread does not contain molecular sulfur or a sulfur donor.

28. The tire according to claim 1, wherein the tread does not contain a vulcanization accelerator.

29. The tire according to claim 1, wherein the tread does not contain an antioxidant agent.

30. A process for preparing the tire according to claim 1 comprising the following steps:
 extruding the tread;
 then placing the extruded tread on the tire; and
 then curing the tire.

* * * * *